United States Patent
Gless et al.

(10) Patent No.: US 9,184,433 B2
(45) Date of Patent: Nov. 10, 2015

(54) BATTERY, BATTERY SYSTEM AND METHOD FOR CONNECTING A PLURALITY OF BATTERIES

(75) Inventors: Michael Gless, Stuttgart-Zazenhausen (DE); Ralf Angerbauer, Möglingen (DE)

(73) Assignee: Robert Bosch GmbH, Stuttgart (DE)

( * ) Notice: Subject to any disclaimer, the term of this patent is extended or adjusted under 35 U.S.C. 154(b) by 446 days.

(21) Appl. No.: 13/521,699

(22) PCT Filed: Jan. 12, 2011

(86) PCT No.: PCT/EP2011/050315
§ 371 (c)(1),
(2), (4) Date: Dec. 3, 2012

(87) PCT Pub. No.: WO2011/086086
PCT Pub. Date: Jul. 21, 2011

(65) Prior Publication Data
US 2013/0196217 A1    Aug. 1, 2013

(30) Foreign Application Priority Data

Jan. 13, 2010  (DE) .......................... 10 2010 000 842

(51) Int. Cl.
*H01M 2/30* (2006.01)
*H01M 2/20* (2006.01)
*H01M 10/052* (2010.01)

(52) U.S. Cl.
CPC .............. *H01M 2/30* (2013.01); *H01M 2/206* (2013.01); *H01M 10/052* (2013.01); *Y02E 60/122* (2013.01); *Y02T 10/7011* (2013.01); *Y10T 29/49108* (2015.01)

(58) Field of Classification Search
CPC ...................................................... H01M 2/202
See application file for complete search history.

(56) References Cited

U.S. PATENT DOCUMENTS

| 2009/0123096 A1* | 5/2009 | Shirai .............................. 384/45 |
| 2009/0208836 A1* | 8/2009 | Fuhr et al. ...................... 429/158 |
| 2010/0105258 A1* | 4/2010 | Koetting et al. ............... 439/883 |

(Continued)

FOREIGN PATENT DOCUMENTS

| CN | 101388445 A | 3/2009 |
| DE | 515 051 | 1/1931 |
| DE | 102 45 384 A1 | 2/2004 |

(Continued)

OTHER PUBLICATIONS

International Search Report corresponding to PCT Application No. PCT/EP2011/050315, mailed Apr. 12, 2011 (German and English language document) (5 pages).

*Primary Examiner* — Ula C Ruddock
*Assistant Examiner* — Scott J Chmielecki
(74) *Attorney, Agent, or Firm* — Maginot, Moore & Beck LLP

(57) ABSTRACT

A battery includes a battery body and at least one terminal protruding from an outside surface of the battery body. The terminal is electrically conductively connected to one of the battery poles. The battery further includes at least one electrically conductive bending lug, which is electrically conductive, connected via the terminal to the battery pole. The bending lug has a length that is greater than a distance of the longitudinal axis of the terminal from the point of penetration through the outside surface up to a lateral edge of the outside surface.

9 Claims, 1 Drawing Sheet

(56) References Cited

U.S. PATENT DOCUMENTS

2010/0266889 A1* 10/2010 Kim .............................. 429/158
2012/0100761 A1* 4/2012 Gro et al. ...................... 439/774

FOREIGN PATENT DOCUMENTS

| JP | 2005-190885 A | 7/2005 |
| WO | 2008/144994 A1 | 12/2008 |

* cited by examiner

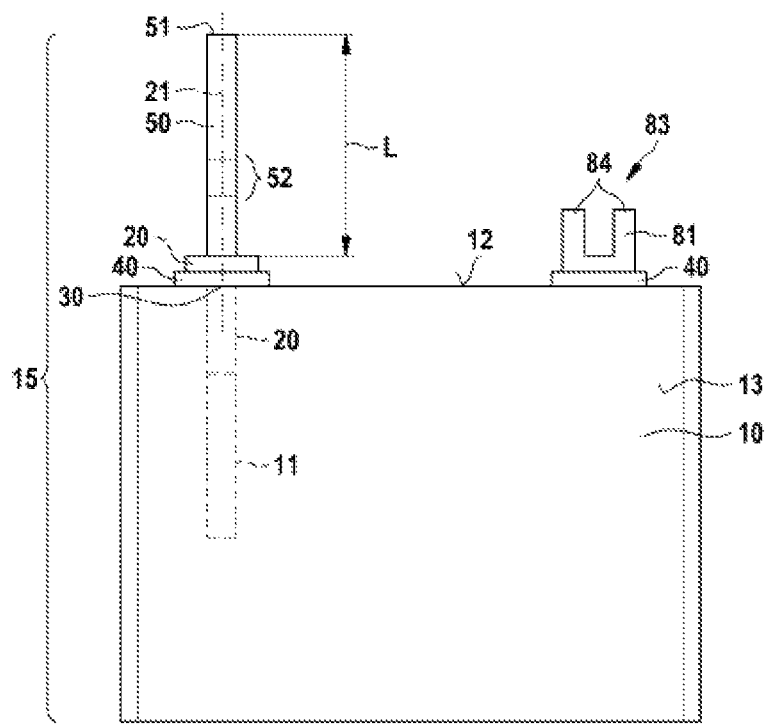
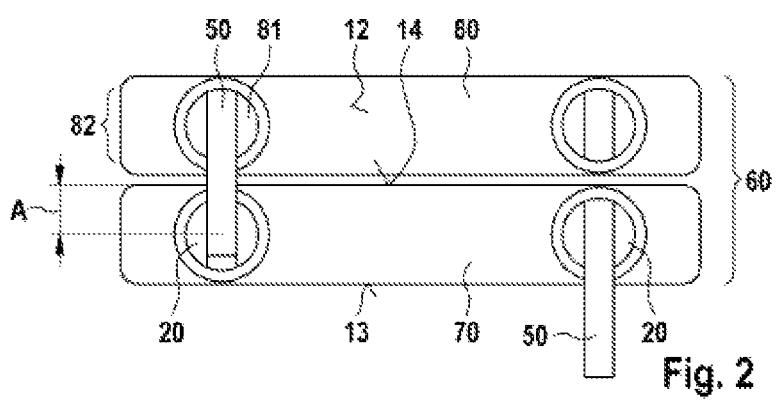

BATTERY, BATTERY SYSTEM AND METHOD FOR CONNECTING A PLURALITY OF BATTERIES

This application is a 35 U.S.C. §371 National Stage Application of PCT/EP2011/050315, filed on Jan. 12, 2011, which claims the benefit of priority to Serial No. DE 10 2010 000 842.7, filed on Jan. 13, 2010 in Germany, the disclosures of which are incorporated herein by reference in their entirety.

The present disclosure relates to a battery, comprising a battery body and at least one terminal which protrudes from an outside surface of the battery body and is electrically conductively connected to one of the battery poles.

The disclosure also relates to a battery system having at least two batteries which are electrically connected to one another, at least one battery of which is configured according to the disclosure.

Furthermore, the disclosure relates to a method for electrically connecting a multiplicity of batteries, at least one battery of which is configured according to the disclosure.

The disclosure is supplemented by a motor vehicle which comprises at least one battery according to the disclosure and/or one battery system according to the disclosure.

BACKGROUND

A battery which comprises one or more galvanic cells serves as an electrochemical energy store and energy converter. When the battery or the respective battery cell is discharged, chemical energy which is stored in the battery is converted into electrical energy by an electrochemical redox reaction. This electrical energy can therefore be requested by a user depending on requirements. The cathode of the battery and/or the terminal arranged on the cathode side is usually composed here of aluminum or an aluminum alloy, and the anode and/or the terminal arranged on the anode side of the battery is usually composed of copper or a copper alloy.

An electrically conductive connection of a plurality of batteries is usually implemented by a screwed-on connector which has, however, relatively high contact resistance owing to its large number of individual parts. Due to corrosion, in particular oxidation, and owing to electrochemical voltage potential differences, a further increase in the contact resistance occurs, in particular in screwed connectors, over their service life.

A further disadvantage of the connector composed of a plurality of parts is the high fabrication and assembly costs, due to a multiplicity of fabrication steps for manufacturing the individual parts of the connector as well as the assembly steps for assembling and installing the connector on the respective battery cells.

DE 102 45 384 A1 discloses a battery plug-on contact in which a cable is provided with a plug, and the plug can be connected to a socket on the battery terminal. This permits simple contact to be made with the battery. However, a relatively large amount of fabrication expenditure is required to manufacture the plug on the cable and for the socket on the terminal. This increases costs dramatically, in particular in the case of large-scale series fabrication. That is to say that contact-forming devices which are arranged securely on poles or terminals of batteries are of structurally complex design in order to permit contact to be made with further connecting means such as, for example, further terminals of other batteries, irrespective of the position of the other battery. Another possibility is to use a flexible connector, but the expenditure on assembly to attach this flexible connector is relatively high.

The described prior art therefore has the disadvantages that in terms of simple and cost-effective configuration it either involves a relatively high degree of expenditure on assembly or, in order to reduce the expenditure on assembly is designed in such a way that simple and fast attachment of connectors is possible, but the individual terminals or the connecting points which are provided for the connection are of structurally complex design.

SUMMARY

According to the disclosure, a battery is made available which comprises a battery body and at least one terminal which protrudes from an outside surface of the battery body and is electrically conductively connected to one of the battery poles. The battery has here at least one electrically conductive bending lug which is electrically conductively connected to the battery pole via the terminal, wherein the bending lug has a length L which is greater than a distance A between the longitudinal axis of the terminal and the location where it passes through the outside surface as far as a lateral edge of the outside surface.

One effect of the disclosure is that in the case of bending at an angle of substantially 90° with respect to the longitudinal axis of the terminal the free end of the bending lug protrudes over the edge of the outside surface in so far as the bending of the bending lug occurs right up against the outside surface. Protruding out in the sense of the disclosure means that the free end of the bending lug extends from a region of the projection of the outside surface in the direction of the terminal longitudinal axis. In this context, the disclosure is related, in particular, to prismatic batteries in which the terminal protrudes from an upper outside surface of the battery, and the batteries are arranged in a stack one against the other to form battery systems and have to be connected to one another in this arrangement. The edge over which the bending lug protrudes is here the edge facing the adjacent battery. This is usually an upper boundary edge of a side surface which is significantly larger than the upper outside surface.

In this context, the length of the bending lug is preferably dimensioned in such a way that the bent-over bending lug extends as far as the center of the adjacent battery in order to be connected there to the terminal of the adjacent battery. For the purpose of manual or automated bending over with a small deployment of energy, there is provision that the material of the bending lug can easily be plastically deformed. At least in the bending region it should preferably have a tension elastic limit of at maximum 100 N/mm². This means that the bending lug should have, at least in the bending region, a tension elastic limit which is at maximum as large as that of a suitable copper alloy or aluminum alloy. Of course, the material of the bending lug is to be selected in such a way that it has a high electrical conductivity.

The advantage of the disclosure is that the bending lug which is attached to a terminal of a battery or a bending lug which is configured as an integral component of a terminal can easily be bent over in a manual or automated fashion in the direction of an adjacent battery with which contact is to be made or else of a contact of a load or generator in order to be attached there in a frictionally and/or positively locking fashion.

In this configuration, just one connecting process for bringing about an electrically conductive contact, specifically on the terminal of the adjacent battery, is necessary. The relatively flexible bending over of the terminal permits small positioning inaccuracies of the batteries to be compensated. In addition to the advantage of the very simple connection or formation of contact with a plurality of batteries, excellent electrical contact between the terminal and the bending lug is also ensured, associated with low contact resistances and a long service life expectation. The flexible bending makes it easily possible to form the connection between the batteries, in particular in the case of a uniform battery design and alternating orientation of the bending lug, in order to be more easily able to connect in series batteries which are arranged in a stack one next to the other. The batteries may have one or more battery cells here. According to the disclosure, a battery is also understood to be a single battery cell which, through external connection of its terminals, can function as a component of a battery or of a battery cell system.

The battery according to the disclosure may be, in particular, a lithium ion battery or a lithium ion battery cell.

The disclosure is advantageously configured when the bending lug has a region with a reduced bending cross section. One point on the preferred bend is therefore defined which has a smaller area moment of inertia than adjacent regions, and accordingly when a torque is applied to the bending lug this gives rise to deformation in this region with a weakened cross section. The region of the weakened cross section is, of course, still of such a size that it ensures sufficient electrical conduction.

The battery according to the disclosure can be configured in such a way that it comprises a connecting element whose components are the bending lug, the terminal and the battery pole. That is to say the bending lug, the terminal and the battery pole are each integral parts of an overall component, specifically of the connecting element. This structural configuration permits simple manufacture of the terminal, of the bending lug and of the battery pole. The connecting element is preferably arranged at the negative pole here and is therefore constructed at least partially from copper or a suitable copper alloy.

In an alternative configuration there is provision that the battery comprises a connecting element whose components are the battery pole and/or the terminal, and the bending lug is electrically conductively connected to the terminal. That is to say, for example, an extra terminal can be attached to a battery pole, which terminal is in turn adjoined by the bending lug, preferably outside the battery body. Such an embodiment may have technological advantages in terms of complexity and costs of fabrication. In this context, the three components of the battery pole, terminal and bending lug do not necessarily have to be present as individual parts but instead the battery pole can, if appropriate, integrally comprise on the terminal to which the bending lug is connected as an extra component in a frictionally and/or positively locking fashion and/or materially joined fashion.

A seal between the terminal and battery body or the outside surface of the battery can preferably be configured in such a way that it constitutes a means of fixedly clamping the bending lug, at least in the plane of the bend which is provided. Alternatively it is possible to provide that in addition to the seal a means of fixedly clamping in the terminal is arranged on the battery housing. The means for fixedly clamping is understood here to be a typical mechanical component which is characterized, inter alia, by the possibility of absorbing bending torques. As a result, a bending torque can be applied to the bending lug without said bending torque being transmitted to the battery pole in the interior of the battery.

According to the disclosure, a battery system is also made available with at least two batteries, in which battery system at least a first battery is configured according to a battery according to the disclosure, wherein the bending lug of the first battery is bent over the edge facing a second battery, of the surface from which the terminal protrudes, and the free end of the bending lug is electrically conductively connected to a terminal of the second battery. However, according to the disclosure this does not mean that the bending region of the terminal of the first battery extends out over the edge of the first battery but rather only, owing to a bend, a bending lug which adjoins the terminal in the direction thereof extends out, preferably at an angle of 90°, with its free end from the projection region of the outside surface from which the terminal of the first battery protrudes.

There is preferably provision here that the terminal of the second battery which is electrically conductively connected to the bending lug of the first battery is embodied in the region of the electrical contact in a way which is at least in part complementary to the shape of the bending lug. It is therefore possible to implement a way of accommodating the battery lug in or on the terminal of the second battery in a positively locking fashion and of therefore improving the electrical contact over the service life.

In an alternative embodiment there is provision that the second battery is also configured according to a battery according to the disclosure and the two bending lugs of the two batteries are connected to one another in a frictionally or positively locking fashion and/or materially joined fashion. That is to say that in this case a terminal of the second battery is also provided with a bending lug and the two bending lugs of the two batteries are connected to one another.

In a first battery in which the bending lug is connected to the terminal as an extra component there is provision that the bending lug of the first battery is composed of the same material as the terminal of the second battery at least in the region of the contact with the terminal of the second battery. It is appropriate here to use copper or a suitable copper alloy as a material of the bending lug in order therefore to permit better welding of the terminal and bending lug.

According to the disclosure, a method is also made available for electrically connecting a multiplicity of batteries, at least a first battery of which is configured according to the disclosure, wherein the bending lug of this first battery is bent over and is electrically conductively connected to a terminal of a second battery. In this context, as already described, a direct connection of a bending lug and terminal of the second battery is preferably provided. The advantage of the method according to the disclosure is, in particular, that after the batteries have been positioned and secured the bending lug on the first battery can easily be bent over with respect to the terminal of the second battery and attached thereto. As a result of the selection of a material with a low tension elastic limit, such as for example aluminum or copper or a suitable alloy thereof, only a small rebound of the bending lug is to be expected so that said lug will substantially maintain the bending angle set through a force effect or torque effect and can be attached to the terminal at this angle.

The method according to the disclosure is advantageously configured by virtue of the fact that the bending lug is connected in a positively locking and/or frictionally locking and/or materially joined fashion to the terminal of the second battery. In particular, the bending lug can be clamped in between two limbs of a U profile of the terminal on the second battery, so that a frictionally locking connection is formed by means of a press fit. In a further particular configuration, the two limbs of the U profile are pulled in the direction of the respective other limb by means of a screw connection, with the result that the clamping effect is increased further and at the same time the bending lug is accommodated in a positively locking fashion in the U profile of the terminal. A materially joined connection can be implemented by welding, in particular laser welding, which can be applied alternatively or additionally in order to connect in a frictionally and/or positively locking fashion. The disclosure is also supplemented by a motor vehicle, in particular an electric vehicle or a hybrid vehicle, which comprises at least one battery according to the disclosure and/or one battery system according to the disclosure.

BRIEF DESCRIPTION OF THE DRAWINGS

Exemplary embodiments of the disclosure are explained in more detail with reference to the drawings and the following description, in which:

FIG. 1 shows a battery according to the disclosure in a view from the side, and

FIG. 2 shows a battery system having two batteries connected in series.

DETAILED DESCRIPTION

The battery 10 according to the disclosure, as illustrated in FIG. 1, will be described first. The battery 10 comprises a battery pole 11 which is indicated by dashed lines and is arranged in the body of the battery 10. The battery pole 11 is adjoined by the terminal 20 which, as illustrated in FIG. 1, protrudes a small degree out of the battery body. In this context, the present disclosure is not restricted to a terminal 20 which protrudes out of the battery 10 but instead it can also be provided that the terminal 20 is likewise arranged completely in the battery body. According to the disclosure, the bending lug 50 adjoins in the direction of the longitudinal axis 21 of the terminal 20. The battery 10 can be configured here in such a way that the battery pole 11, the terminal 20 and the bending lug 50 are all integral components of a connecting element 15. This connecting element 15 can be a continuous component which makes available the battery pole 11 in the battery 10, constitutes the terminal 20 at the transition to the outside and whose region which protrudes out of the battery 10 is configured as a bending lug 50. That is to say the bending lug 50, which protrudes out of the battery body, adjoins a terminal 20 which is completely arranged in the battery body.

The illustrated terminal 20 extends through the upper outside surface 12 of the battery 10 at the penetration location 30. A seal 40 is preferably arranged between the terminal 20 and the upper outer surface 12. The free end 51 of the bending lug 50 therefore points away from the upper outside surface 12 of the battery 10. In order to implement a simple bend in the bending lug, the latter can have a region with a reduced bending cross section 52 which is arranged right against the transition with the terminal 20 or on the upper outside surface 12.

When the bending lug 50 is bent, it can, as illustrated in FIG. 2, be easily connected to the terminal 81 of a second battery 80. The bending therefore occurs about a bending axis which runs substantially perpendicularly with respect to the longitudinal axis 21 of the terminal. The bent-over bending lug 50 therefore connects a first battery 70 to a second battery 80 to form a battery system 60. It is clear that the length L of the bending lug 15 is sufficiently long to project out beyond a lateral edge of the outside surface 14 over the distance A between the penetration location 30 and said lateral edge and to be placed in contact with the terminal of the second battery 81. The lateral edge of the outside surface 15 is also the upper edge of the lateral surface 13 here in prismatic batteries 10, as can be seen in FIG. 1.

The first battery 70 in FIG. 2 has here bending lugs on both terminals, which bending lugs are bent over in different respective directions. It is therefore possible to implement the displayed connection of the second battery 80, and the connection of a further battery (not illustrated) which is to be connected in series on the other terminal 20.

In order to improve the electrical contact, the terminal of the second battery 80 is embodied according to the terminal 81 illustrated in FIG. 1, but the battery 10 illustrated in FIG. 1 is not restricted to the arrangement of the illustrated terminals 20 and 81 but it is instead also possible to provide that the second terminal on the battery 10 has a basically different structural configuration.

As is apparent from FIG. 2, the second battery 80 has a terminal 81 which is preferably embodied in accordance with the terminal 81 in FIG. 1. This terminal 81 comprises a U profile 83, which is formed substantially from two limbs 84, and an electrical contacting region 82. Therefore, the bending lug 50 can, as illustrated, be inserted between the two limbs 84 and/or clamped by them. This ensures a more reliable electrical contact. That is to say in order to produce the electrical connection between the two batteries 70 and 80 the bending lug only has to be bent over and clamped into the terminal 81 in order to obtain an electrically conductive connection between the two batteries.

In order to facilitate the bending over, there is preferably provision that the bending lug has a width which is less than its depth, wherein the width is the dimension which can be measured substantially parallel to the bending axis, and the depth is the dimension which can be measured substantially perpendicularly to the bending axis.

The invention claimed is:

1. A battery, comprising:
   a battery body;
   a battery pole positioned in the battery body;
   at least one terminal configured to protrude from an outside surface of the battery body, wherein the at least one terminal is electrically connected to the battery pole; and
   at least one electrically conductive bending lug which is electrically conductively connected to the battery pole via the at least one terminal,
   wherein the at least one bending lug has a length which is greater than a distance between the longitudinal axis of the at least one terminal and a location where the at least one bending lug passes through the outside surface as far as a lateral edge of the outside surface; and
   wherein the at least one bending lug is configured to be bent at a region with a reduced bending cross section.

2. The battery as claimed in claim 1, further comprising:
   a connecting element whose components are the at least one bending lug, the at least one terminal, and the battery pole.

3. The battery as claimed in claim 1, further comprising:
   a connecting element whose components are the battery pole and or the at least one terminal, and
   wherein the at least one bending lug is electrically conductively connected to the at least one terminal.

4. A battery system comprising:
   at least two batteries which are electrically connected to one another,
   wherein at least a first battery of the battery system includes: (i) a battery body, (ii) a battery pole, (iii) at least one terminal configured to protrude from an outside surface of the battery body, wherein the at least one terminal is electrically conductively connected to the battery pole, and (iv) at least one electrically conductive bending lug which is electrically conductively connected to the battery pole via the at least one terminal, wherein the at least one bending lug of the first battery has a length which is greater than a distance between the longitudinal axis of the at least one terminal and a location where the at least one bending lug passes through the outside surface as far as a lateral edge of the outside surface, and wherein the at least one bending lug of the first battery is bent as far as over an edge facing a second battery, of the outer surface from which the at least one terminal protrudes, and a free end of the at least one bending lug of the first battery is electrically conductively connected to a terminal of the second battery.

5. The battery system as claimed in claim 4, wherein the terminal of the second battery is embodied, in a region of electrical contact with the at least one bending lub of the first battery, in a way which is at least in part complementary to the shape of the at least one bending lug of the first battery.

6. The battery system as claimed in claim 5, wherein:
the first battery further includes a connecting element whose components are the battery pole and/or the at least one terminal of the first battery,
the at least one bending lug of the first battery is electrically conductively connected to the at least one terminal of the first battery, and
the at least one bending lug of the first battery is composed of the same material as the terminal of the second battery at least in a region of electrical contact with the terminal of the second battery.

7. A method for electrically connecting a plurality of batteries, comprising:
bending over a bending lug of a first battery of the plurality of batteries; and
electrically conductively connecting the bending lug to a terminal of a second battery of the plurality of batteries,
wherein the first battery further includes: (i) a battery body, (ii) a battery pole positioned in the battery body, and (iii) at least one terminal configured to protrude from an outside surface of the battery body,
wherein the at least one terminal is electrically conductively connected to the battery pole,
wherein the bending lug is electrically conductively connected to the battery pole via the at least one terminal, and
wherein the bending lug has a length which is greater than a distance between the longitudinal axis of the at least one terminal and a location where the bending lug passes through the outside surface as far as a lateral edge of the outside surface.

8. The method for electrically connecting a plurality of batteries as claimed in claim 7, wherein the bending lug is connected in a positively locking and/or frictionally locking and/or materially joined fashion to the terminal of the second battery.

9. A motor vehicle comprising the battery of claim 1.

* * * * *

UNITED STATES PATENT AND TRADEMARK OFFICE
CERTIFICATE OF CORRECTION

| | | |
|---|---|---|
| PATENT NO. | : 9,184,433 B2 | Page 1 of 1 |
| APPLICATION NO. | : 13/521699 | |
| DATED | : November 10, 2015 | |
| INVENTOR(S) | : Gless et al. | |

It is certified that error appears in the above-identified patent and that said Letters Patent is hereby corrected as shown below:

Claims:
1) In column 6, lines 32-47, claim 1 should read as follows:

1. A battery, comprising:
a battery body;
a battery pole positioned in the battery body;
at least one terminal configured to protrude from an outside
   surface of the battery body, wherein the at least one
   terminal is electrically conductively connected to the battery pole; and
at least one electrically conductive bending lug which is
   electrically conductively connected to the battery pole
   via the at least one terminal,
wherein the at least one bending lug has a length which is
   greater than a distance between the longitudinal axis of
   the at least one terminal and a location where the at least
   one bending lug passes through the outside surface as far
   as a lateral edge of the outside surface; and
wherein the at least one bending lug is configured to be bent
   at a region with a reduced bending cross section.

2) In column 7, lines 13-17, claim 5 should read as follows:

5. The battery system as claimed in claim 4, wherein the
terminal of the second battery is embodied, in a region of
electrical contact with the at least one bending lug of the first
battery, in a way which is at least in part complementary to the
shape of the at least one bending lug of the first battery.

Signed and Sealed this
Twenty-first Day of June, 2016

Michelle K. Lee
*Director of the United States Patent and Trademark Office*